(12) United States Patent
Anderson

(10) Patent No.: US 6,202,244 B1
(45) Date of Patent: Mar. 20, 2001

(54) VEHICLE WASHING MACHINE

(76) Inventor: Kevin J. Anderson, 1310 N. Main, Bluffton, IN (US) 46714

( * ) Notice: Subject to any disclaimer, the term of this patent is extended or adjusted under 35 U.S.C. 154(b) by 0 days.

(21) Appl. No.: 09/374,428

(22) Filed: Aug. 13, 1999

Related U.S. Application Data

(62) Division of application No. 08/659,760, filed on Jun. 6, 1996, now Pat. No. 5,979,002.

(51) Int. Cl.$^7$ ....................................................... B60S 3/06
(52) U.S. Cl. ............................ 15/53.2; 15/53.3; 15/97.3; 15/DIG. 2
(58) Field of Search .................................. 15/53.1, 53.2, 15/53.3, 53.4, 97.3, DIG. 2

(56) References Cited

U.S. PATENT DOCUMENTS 4,166,303 * 9/1979 Fromme .................................. 15/97.3

FOREIGN PATENT DOCUMENTS

1188599 * 6/1985 (CA) ...................................... 15/97.3

* cited by examiner

*Primary Examiner*—Randall E. Chin
(74) *Attorney, Agent, or Firm*—Lundy and Associates

(57) ABSTRACT

A new and improved vehicle wash apparatus having a rigid arm with opposite ends. One end is journaled about a generally vertically extending pivot to a washer frame which extends over the vehicle being washed. The rigid arm at its distal end is journaled about a horizontally disposed pivot rod connected to a moveable arm extension having a distal end. A rotary brush is journaled at the distal end of the moveable arm extension for rotation about a vertical axis. The moveable arm extension and brush is moveable both inwardly and outwardly of the vehicle wash frame on both sides of the vertical position and being biased inwardly thereof. The rigid arm is biased into a position generally transverse to the movement of the vehicle being washed relative to the arm, whereby the rotating brush is always in contact with the vehicle being washed. The invention also includes an improved vehicle wash apparatus having such a vehicle wash arm and brush whereby both sides and both ends of the vehicle are all washed in one pass through the vehicle wash apparatus.

17 Claims, 3 Drawing Sheets

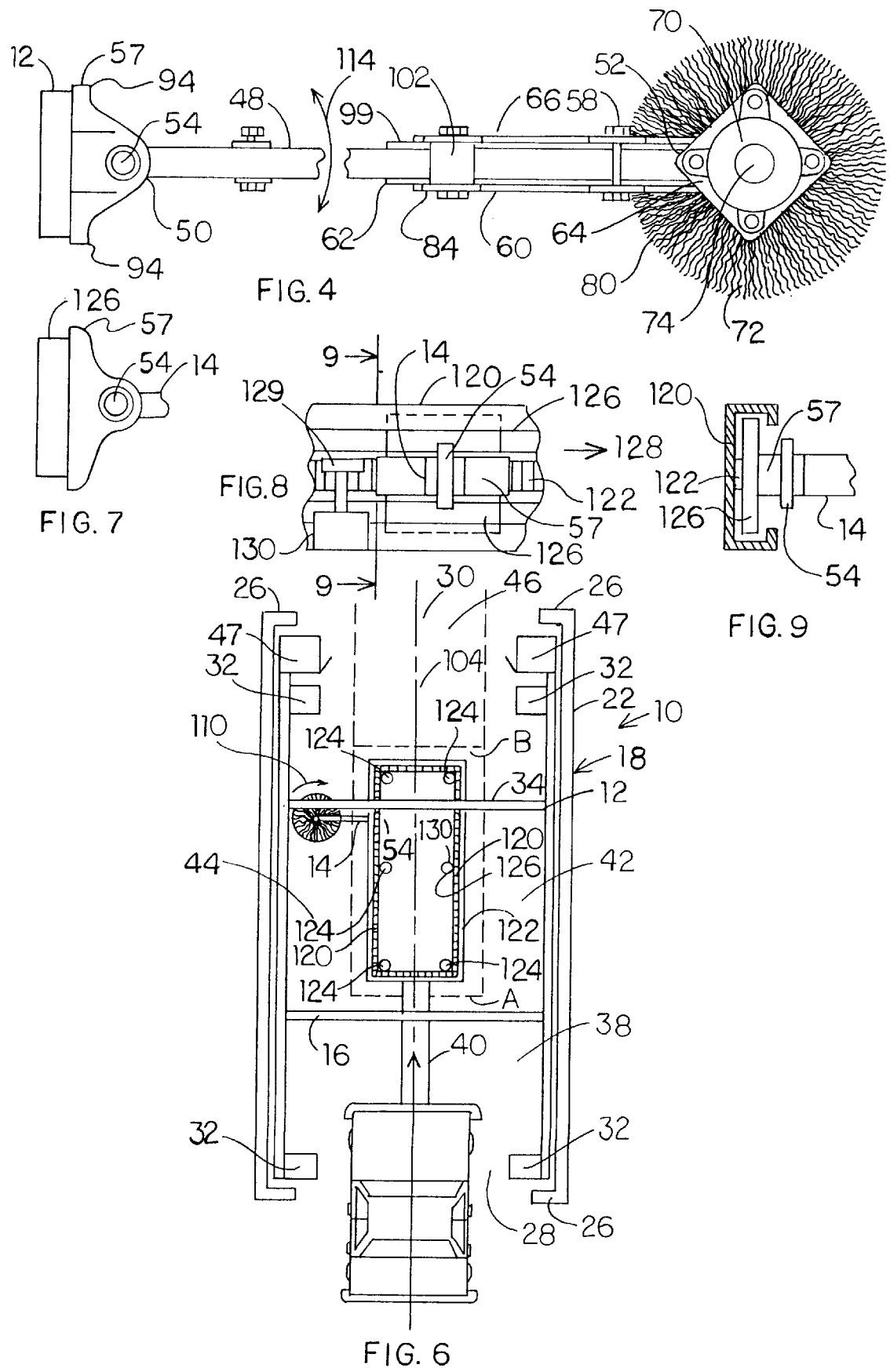

VEHICLE WASHING MACHINE

This application is a divisional of U.S. patent application Ser. No. 08/659,760 filed on Jun. 6, 1996, now U.S. Pat. No. 5,979,002 entitled VEHICLE WASHING MACHINE by the same inventor.

BACKGROUND OF THE INVENTION

The present invention relates to vehicle washing machines or machines for washing articles having opposite ends and sides, and more particularly, to such a washing machine which uses vibrating cloth curtains and rotating brushes to accomplish the washing.

Vehicle washing machines have been proposed for some time. Nearly every community and every major town has one or more of these vehicle washing machines in commercial operation. Those machines that were proposed, generally included various configurations of cloth, drapes or curtains and spinning brushes to clean automobiles, trucks and the like. Some did better than others. It has always been highly desirable to provide a new and improved vehicle wash apparatus.

A second generation of vehicle wash apparatus was proposed in which various additions to the wash apparatus were added and cooperatively combined therewith. These included wheel wash devices, underbody wash devices, drying apparatus, polishing and waxing apparatus and the like. A whole new plethora of vehicle wash apparatus evolved. It has always been highly desirable to provide a new vehicle wash apparatus to which all of these attachments could be combined cooperatively.

At this period of time and subsequently, a third generation of vehicle wash apparatus has been proposed. These have concentrated on the expense of such apparatus and the mechanical complexity of the apparatus in providing all of these features. In general, vehicle wash apparatus have become very complex with a variety of pivots, small motors, actuators, and timers cooperating in an atmosphere of moist air, water sprays and corrosive soap mixtures. It is therefore highly desirable to provide a new and improved vehicle wash apparatus having a minimum of parts, a minimum of pivot joints, a minimum of small motors and the like. It is also highly desirable to provide a new and improved vehicle wash apparatus which requires minimal maintenance and upkeep and will have an extended life. Finally, it is highly desirable to provide an improved vehicle wash machine which has all of the above features and is relatively inexpensive to manufacture and maintain.

SUMMARY OF THE INVENTION

It is therefore an object of the invention to provide a new and improved vehicle wash apparatus.

It is also an object of the invention to provide a new vehicle wash apparatus to which all of these attachments can be combined cooperatively.

It is also an object of the invention to provide a new and improved vehicle wash apparatus having a minimum of parts, a minimum of pivot joints, a minimum of small motors and the like.

It is also an object of the invention to provide a new and improved vehicle wash apparatus which requires minimal maintenance and upkeep and will have an extended life.

It is finally an object of the invention to provide an improved vehicle wash machine which has all of the above features and is relatively inexpensive to manufacture and maintain.

In the broader aspects of this invention there is provided a new and improved vehicle wash apparatus having a rigid arm with opposite ends. One end is journaled about a generally vertically extending pivot to a washer frame which extends over the vehicle being washed. The rigid arm at its distal end is journaled about a horizontally disposed pivot rod connected to a moveable arm extension having a distal end. A rotary brush is journaled at the distal end of the moveable arm extension for rotation about a vertical axis. The moveable arm extension and brush is moveable both inwardly and outwardly of the vehicle wash frame on both sides of the vertical position and being biased inwardly thereof. The rigid arm is biased into a position generally transverse to the movement of the vehicle being washed relative to the arm, whereby the rotating brush is always in contact with the vehicle being washed. The invention also includes an improved vehicle wash apparatus having such a vehicle wash arm and brush whereby both sides and both ends of the vehicle are all washed in one pass through the vehicle wash apparatus.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 4 is a top planar view of the improved vehicle wash arm shown in FIG. 3;

FIG. 6 is a top view like FIGS. 1 and 5 illustrating a vehicle wash apparatus of the invention showing the motion of a single wash arm in cleaning the front, opposite sides and rear of a vehicle;

FIG. 7 is a fragmentary view like FIG. 4 showing the mounting of the wash arm of the invention in the apparatus illustrated in FIG. 6;

FIG. 8 is a fragmentary planar view of the track, chain and mounting of the wash arm of the vehicle wash apparatus illustrated in FIGS. 6 and 7; and FIG. 9 is a fragmentary planar view of the track, chain and wash arm shown in FIG. 8 taken essentially along the section line 9—9 of FIG. 8.

DESCRIPTION OF A SPECIFIC EMBODIMENT

Figure 1:
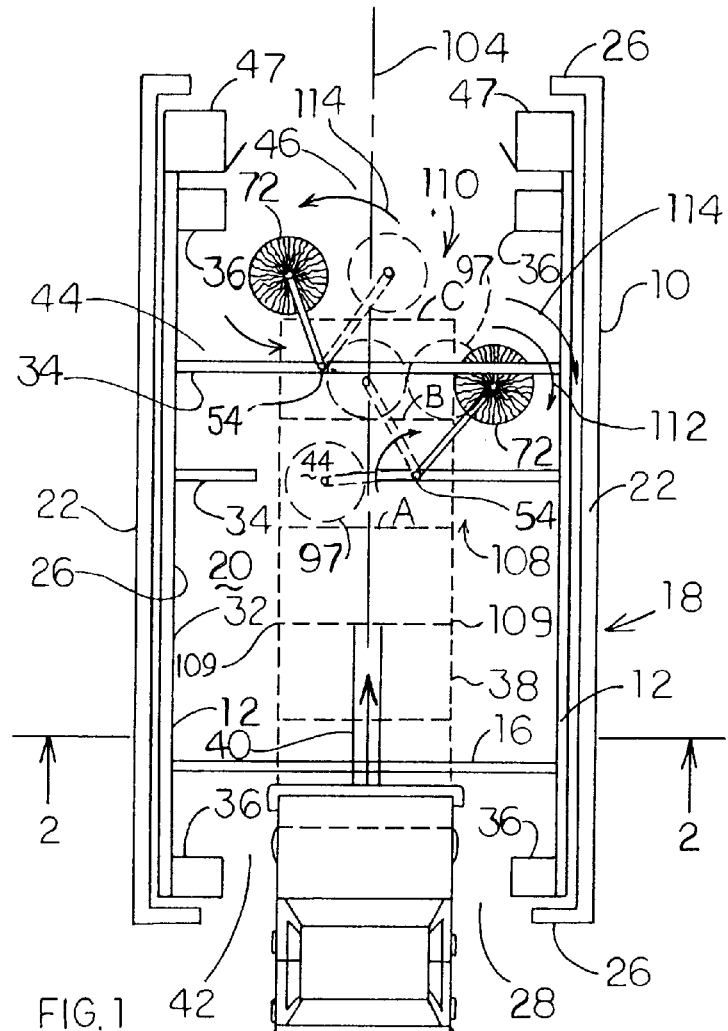
FIG. 1 is a top planar view of the vehicle wash apparatus of the invention with a portion of the top and frame removed to show the path of the vehicle through the wash apparatus of the invention and the motion of two wash arms and brushes in cleaning the front and opposite sides of a vehicle.

The improved vehicle washing machine of the invention is shown to include in FIG. 1 an outer enclosure 10, a machine frame 12 on which both vehicle wash arms 14 and their accessories such as the vibrating cloth curtains 16 which together make up the improved vehicle wash machine 18 of the invention are supported. Enclosure 10 in specific embodiments may be buildings, self supporting upstanding structures on a concrete slab, or any enclosure in between. The only requirements of enclosure 10 are those of any vehicle wash enclosure such as the floor having drains and necessary mechanism 40 for dragging the vehicle through the wash mechanism on a predetermined path 38, suitable cover from the elements, suitable resistance to the moist environment of a vehicle wash system, and the like. Enclosure 10 as shown in the Figures, includes a floor 20, upstanding side walls 22 and a roof 24. Enclosure 10 has opposite end upstanding walls 26 having an entrance opening 28 and a exit opening 30 therein respectively.

Frame 12 is shown to comprise upright members 32 positioned adjacent each of the sides adjacent upstanding sides 22 and a plurality of overhead cross beams 34 on which the various elements of the vehicle wash machine of the invention are supported. Each of the uprights 32 extend upwardly from footings 36 such that the frame 12 is self supporting independently of the building 10. In other specific embodiments, the frame 12 can be a portion of the building 10 and need not be self supporting. For example, the cross beams 34 can merely be rafter like elements extending between opposite walls of a building having opposite entrance 28 and exit 30 openings and a defined vehicle path 38 as shown in the Figures.

Frame 12 and the enclosure 10 cooperate to define the vehicle path 38. In the floor 20 of the enclosure 10 there is positioned vehicle drag line 40. The positioning of the vehicle wash arms 14 and cloth curtain 16 and the other vehicle wash accessories is chosen relative the path 38. Path 38 has a preliminary portion 42 in which preliminary vehicle wash operations are performed, a vehicle wash portion 44 in which the vehicle wash arms 14 of the invention are mounted, and after wash portion 46 in which dryers 47, wax apparatus, and other post wash operations are performed. It is at the end of the preliminary portion 42 or at the beginning of the wash portion 44 in which the cloth curtains 16 are positioned and vehicle is first applied with water and soap. It should be understood that the vehicle wash machine 18 of the invention can be associated with all of the conventional preliminary, vehicle wash, and after wash mechanisms available at the time of invention and nothing stated in this disclosure should limit in any way the combination of such apparatus with the improved vehicle wash machine 18 of the invention to accomplish an over all improved vehicle cleaning system.

Other specific embodiments, not shown in the figures, provide vehicle prewash operations, vehicle wash operations and vehicle post wash operations all formed in a single wash section. The only separation being between wash and drying operations. In such an embodiment, the prewash operations would be performed under the vehicle wash arms 14 as shown in FIG. 1 and the prewash section would be completely eliminated.

Figures 3, 5:
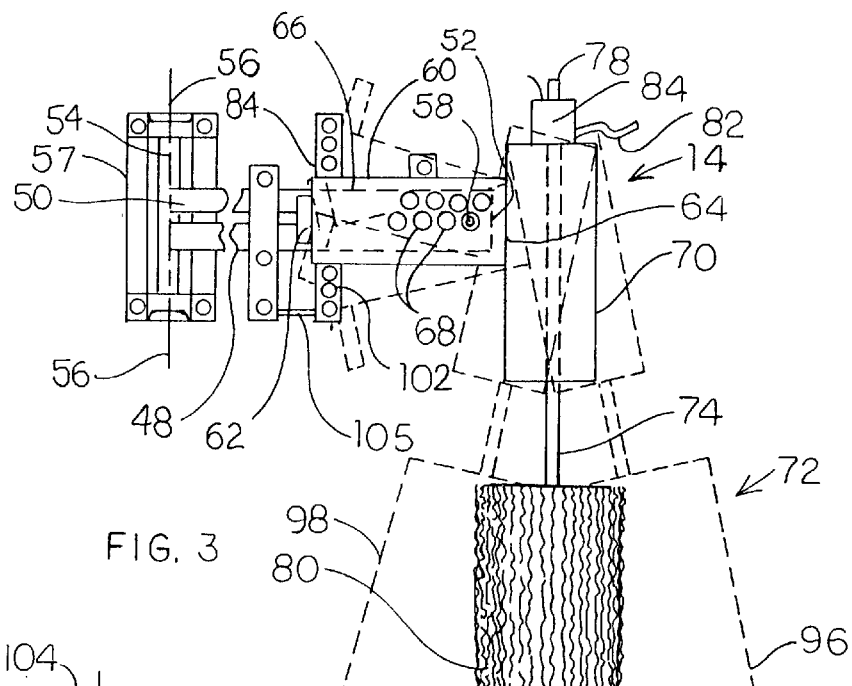
FIG. 3 is a side view of the improved vehicle wash arm of the invention.
FIG. 5 is a top view like FIG. 1 showing the movement of two of the vehicle wash arms of the invention in cleaning the rear of a vehicle passing through the vehicle wash apparatus of the invention.

Referring specifically to FIGS. 3 and 4, there is shown the improved vehicle wash arm 14. Wash arm 14 has a rigid arm 48 having opposite ends 50 and 52. End 50 is journaled about a pivot pin 54 having a generally vertical axis 56 to a bracket 57 which is secured to frame 12. Arm 48 extends generally horizontally from frame 12 and has adjacent end 52 a pivot pin 58 secured thereto which extends generally horizontally and at right angles to pivot pin 54. An arm extension 60 has opposite ends 62 and 64. Adjacent end 62, arm extension 60 is formed into a yoke 66 into which arm 48 adjacent end 52 extends. Yoke 66 has a plurality of openings 68 adjacent end 52 in which pivot 58 may be journaled. Openings 68 are arranged on arm extension 60 in a plurality of rows such that the positioning of the pivot pin 58 therein allows for adjustment of both the distance between the axes of arm 48 and arm extension 60 and the axial length of the combination of arm 48 and arm extension 60. Secured to the distal end 64 is a journal 70 in which a wash brush 72 is journaled. Wash brush 72 depends from the journal 70 and has a shaft 74 with opposite ends 76 and 78. Adjacent end 76, a conventional wash brush 80 is secured to shaft 74. Mounted on extension arm 60 adjacent end 78 is a hydraulic motor 84 secured to shaft 74. Motor 84 is operatively connected via hydraulic lines 82 to a hydraulic cylinder (not shown) so as to drive shaft 74 of wash brush 72 whenever the motor 84 is actuated.

Pivot pin 54 and its axis 56 are not totally vertical. In planes extending axially of the improved vehicle wash machine frame 12, pivot pin 54 and axis 56 are totally vertical and extend through these planes when projected. In the plane including axis 56 extending transversely of axis 104, pivot pin 54 and vertical axis 56 slope inwardly toward the axis 104 so as to provide an at rest position 97 within the arc defined by arrow 114 which is central to the full 180° movement of the vehicle wash arm 14 and which extends generally transversely of frame 12. Vehicle wash arm 14 when moved from its transverse at rest position 97 will always tend and is biased to move into its at rest position. The movement is actuated by the weight of the vehicle wash arm 14 which when moved from the at rest position 97 is always elevated vertically from the at rest position 97.

Vehicle wash arm 14 is allowed to pivot about pivot pin 54 and axis 56 approximately 180° as shown in FIGS. 1 and 5. Stops 94 secured to bracket 57 prevent arm 14 from moving beyond 180°. In other specific embodiments, stops 94 will be primarily engagements between the vehicle wash arm 14 and the frame 12. As will be mentioned hereinafter, the movement of arm 14 between the stops 94 is accomplished primarily by interaction between the brush and the vehicle being washed and gravity.

In all specific embodiments, the wash arm will move between stops 94 upon engaging the vehicle being washed without the car touching the wash arm 14. Gravity will position the wash arm 14 transversely of the path 38 in its at rest position 97. Arcuate movement about pivot pin 54 in either direction is against gravity because of the slight tilt inwardly of the pivot pin 54. Because of the non verticality of the pivot pin 54, any movement of vehicle arm 14 from its at rest position lifts the weight of vehicle wash arm 14 about the lever arm extends from axis 58 to shaft 74 of the arm 14 vertically upwardly from its at rest position 97. When a vehicle being washed engages brush 80 of a vehicle arm 14 of the invention, the vehicle will move the brush about pin 54 arcuately as shown against gravity. The weight of the vehicle wash arm 14 keeps the wash brush 80 against the vehicle being washed. In this fashion, each of the brushes 72 of the vehicle arms 14 will move across the front end of the vehicle down the side of the vehicle, and then reverse direction about pivot pin 54 and move across the rear of the vehicle back into its at rest position, always against the gravitational force of the vehicle wash arm 14.

The force moments of the vehicle wash arm 14 about pivot pin 54 may be increased or decreased by moving pivot pin 58 between openings 68 to adjust the overall length of vehicle arm 14, both the length of the lever arm extending from the axes of pivot pin 78 to shaft 74 and the weight of the vehicle arm 14 about pivot pin 54 increases as the vehicle arm 14 is adjusted longer and both the length of the lever arm and the weight of the vehicle arm 14 about pivot pin 54 decreases as the pivot pin 58 is adjusted in the openings 68 to shorten the vehicle arm 14. The moment of vehicle wash arm 14 about pivot pin 54 is that which causes vehicle wash arm 14 to move across the front end, side and rear end of the vehicle being washed.

Vehicle arm extension 60 is also allowed to pivot about pivot 58 with respect to arm 48 between an outward position 96 and an inward position 98 as suggested by arrow 110 in FIG. 3. Stops 102 are provided to extend between the opposite portions of yoke 66 as shown in FIG. 4 to define positions 96, 98. The movement between brush positions 96 and 98 is also by interaction between the brush and the vehicle being washed as will be explained more fully hereinafter. In a specific embodiment, a sheet 99 of lubricating material is secured to both sides of arm 48 adjacent end 50 to ease the movement around pivot 58.

The pivot 58 in openings 68 will also lengthen or shorten the moment about pivot pin 58 and increase the force necessary to move brush 72 from its at rest position 98. However, since most of the weight of vehicle arm 14 is at its distal end 64 because of the brush assembly 72, the adjustment of the pivot pin 58 in the openings 68 affects to a greater percentage the moment of arm extension 60. The movement of the pivot pin 58 to an adjacent opening 68 will increase the moment of arm 14 a lesser percentage than the moment of arm extension 60.

The moment of arm extension 60 about pivot pin 58 is that which maintains brush 72 against the vehicle being washed. While the gyroscopic progression of the spinning brush 72 during the wash operation may not be significant at all locations during the wash cycle, in the specific embodiment described herein, the brushes 72 are always spun in a direction toward the vehicle being washed.

A shock absorbing and spring mechanism 105 may extend between arm 48 and arm extension 60 to dampen the motion between brush positions 96 and 98 and to bias brush 80 into position 98. In most embodiments of the invention, mechanism 105 is not necessary as the weight of arm 48 and arm extension 60 is sufficient to bias the brush 80 and the friction of pins 54, 58 is sufficient to dampen the movement thereabout.

As shown in FIGS. 1 and 5, a pair of vehicle wash arms 14 with brushes 80 attached are mounted on frame 12. These brushes are mounted on opposite sides of axis 104 of the machine 18 and are within the vehicle path 38. The arms 14 of pair 108, 110 are mounted fore and aft of each other with pivot pin 54 such that the fore brush arm combination 108 and the aft brush arm combination 110 can both at rest have their brushes adjacent center line 104. The distance between pivot pin 54 and shafts 74 is chosen such that brushes of fore and aft combinations 108, 110 overlap each other in their at rest positions adjacent center line 104 and extend outwardly in most extended positions to allow a vehicle of the maximum width intended to be washed to pass therebetween. As will be explained hereinafter, the movement of brush arm combinations 108 and 110 will never encompass their full 180° and will only move about 80° when washing a vehicle of minimum width. Vehicles larger in width than the agreed upon minimum will move brush arm combinations 108 and 110 to no more than about 135°.

Referring to FIGS. 6–9, there is shown an improved vehicle wash apparatus 118 of the invention which is designed to fully wash a vehicle utilizing only a single vehicle wash arm 14. The improved vehicle wash apparatus 118 has most all of the structure heretofore described with regard to the improved vehicle wash apparatus 18 shown in FIGS. 1–5. However, instead of a pair of vehicle wash arms 14 secured to the frame 12 by pivot pins 54, a single wash arm is secured to a chain 120 which runs in a track 122 which is secured to transverse frame members 34. Track 122 is rigid with respect to the frame. Chain 120 is positioned within the track and moves within the track about idler gears 124. There may be as many idler gears 124 as necessary as to keep the chain positioned. Pivot pin 54 is journaled to the chain 120.

In the specific embodiment illustrated, bracket 57 is secured to a block 126 which is positioned to move in track 122. Block 126 is immovable in all directions other than the direction of arrow 128 with regard to track 122 and track 122 is rigidly secured to frame 12. By this structure, the axis 56 of pivot pin 54 may be maintained in its generally vertical position as above described such that the wash arm 14 always moves against gravity during the wash cycle as before described. Block 126 is secured to the chain 120 so as to move between idler gears 124. The chain 120 is driven by a hydraulic motor 130 having a drive sprocket 129 secured to its shaft so as to engage chain 120 as shown in FIG. 8.

Upon the actuation of hydraulic motors 84 and 130, brush 80 will spin and wash arm 14 will move and pivot pin 54 will move in the track 122 as above described about the vehicle to be washed completely washing the vehicle utilizing only a single wash arm 14. The length and width of the track 122 is such to position the pivot pin 54 in the same relative position with regard to the car being washed as the pair of pivot pins 54 shown in FIGS. 1–5. Thus, the track 122 is centered on center line 104 and has length and width dimensions which allow the vehicle to be moved relative to frame 12 and the pivot pins to be moved relative to the vehicle being washed so as to position them in all of the positions relative to the moving vehicle illustrated in FIGS. 1 and 5.

In operation, the vehicle washing machine functions to totally clean the exterior of a vehicle by passing the vehicle through the frame 12 along the path 38 as suggested by FIGS. 1, 5 and 6. The vehicle passes into toe preliminary or prewash section 42 and the vehicle is wetted down and applied with soap and one or more vibrating cloth curtains 16 are dragged over the vehicle to emulate a soapy wash cloth on the front hood, top, rear trunk lid and back in position A. In specific embodiments, the prewash section 42 can also include specialty items such as wheel cleaners, underbody washes, salt removal procedures and the like. As the vehicle moves towards the arms 14 the vehicle has been fully wetted and soaped.

The vehicle engages the first brush which is illustrated on the right hand side of FIGS. 1 and 5 when the vehicle reaches position B as shown in FIG. 1. At that moment, the brush is engaged by actuating the motor 86 to rotate the brush and to spray the brush with soapy water as is conventional. The rotating brush engages the front of the vehicle to the right of center and moves by its action against the vehicle to the right of the vehicle and down its right side as it rotates in a counter-clockwise direction. The counter-clockwise direction functions to assist the brush 80 moving against the vehicle. As the brush always is moving towards the vehicle, the brush moves as depicted by both arrows 112 and 114 across the front of the vehicle and down the right side.

Shortly, the vehicle will be positioned in position C, also shown in FIG. 1, and engages the other and left side of vehicle wash arm 14. Like the left hand and other of the pair, the brush is actuated both to rotate and to have suitable soapy water supplied to the brush as is conventional. The brush rotates in accordance with arrows 112 and 114. The right hand brush rotates clockwise into the vehicle as above described. In the left hand brush, this rotation is counterclockwise. The brush arm 14 also rotates as suggested by arrows 114 across the front and down the left hand side of the vehicle as a result of the brush action against the vehicle. It will be noted that the brushes 80 of the right hand and left hand vehicle wash arms 14 of the pair overlap in their at rest position. In a specific embodiment, the brush 80 of the left vehicle wash arm 14 in its at rest position is located to the right of the center line or axis 104, and the brush 80 of the right hand vehicle wash arm 14 in its at rest position is located to the left of the center line or axis 104.

Figure 2:
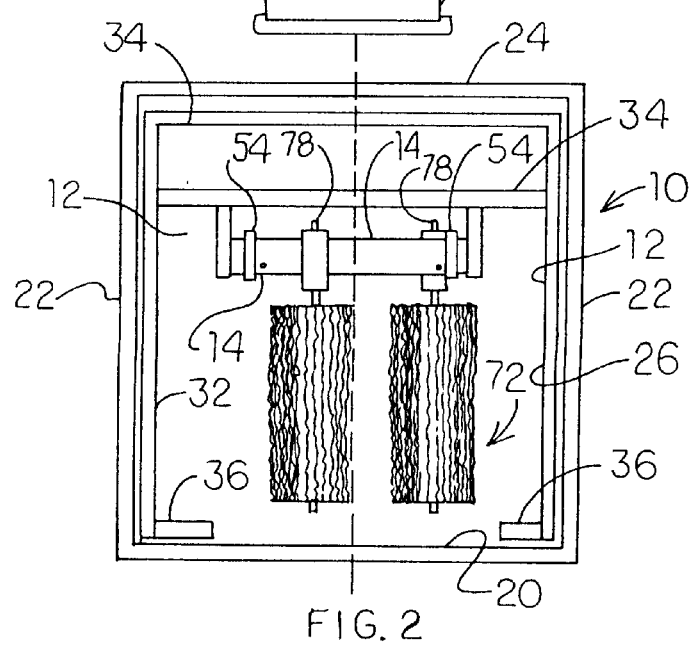
FIG. 2 is a cross-sectional view of the apparatus shown in FIG. 1 taken substantially along the section line 2—2 of FIG. 1.

Brushes 80 are elongated and generally cylindrical as shown in FIG. 2. The axial length of the brushes 80 spans from the top of the vehicle to the bottom of the vehicle, a few inches above the bottom 20 of the enclosure 10. Thus, as the brushes move down the opposite sides of the vehicle, the full side of the vehicle is cleaned. Additionally, each of the brushes 80 are expanded upon rotation and sprayed with soapy water. Brushes 80 have a radius sufficient to accommodate all of the protrusions, indentions and general unevenness from the planar generally vertical surface defined by the vehicle ends and sides.

In specific embodiments, brushes 80 have a radius from about 25 to about 40 inches for this accommodation. In these specific embodiments the axial length of brushes 80 are from about 60 to about 80 inches for automobiles.

Referring to FIG. 5, the vehicle wash arms and brushes 80 will transverse the opposite sides of the vehicle and the vehicle will ultimately be positioned in position D as shown in FIG. 5. As the vehicle approaches position E, the left hand brush will first round the rear corner 108 of the vehicle and move across the rear of the vehicle to its at rest position. Subsequently, with the vehicle in position E, the right hand brush will round the rear corner 106 and move across the rear of the vehicle to its at rest position as shown in FIG. 4. In this manner, the vehicle is totally cleaned and the brushes are in their at rest position awaiting the next vehicle. If there is no next vehicle immediately awaiting, the motors 86 are deactuated and the water is shut off to the brushes 80, and the brushes 80 await in a collapsed condition as shown in FIG. 2 for the next vehicle.

Referring now to FIGS. 6–9, the operation of the vehicle wash apparatus 118 will now be described. In most respects, the operation of the vehicle wash apparatus 118 is similar to that described above with regard to vehicle wash apparatus 18 illustrated in FIGS. 1–5. The major differences with the vehicle wash apparatus 118 is that the vehicle may move at different speeds in the specific embodiments illustrated and the pivot pin 54 is rotated with respect to the automobile being washed so as to position the pivot pin 54 with respect to the automobile in the same relative position as above described with regard to vehicle wash apparatus 18 shown in FIGS. 1 and 5. The movement of pivot pin 54 is accomplished via the track 122, the chain 120, the motors 84, 130 illustrated in FIGS. 6–8. Thus, when the vehicle to be washed reaches position A, both motors 84 and 130 are actuated and the brush 80 is spun and the pivot pin 54 begins its traverse around track 122. In all instances, pivot pin 54 is vertical in planes extending axially of the wash apparatus 118 and tilted inwardly towards axis 104 in cross-sections taken transversely of the wash apparatus 18. This is accomplished by the tilt of the track 122. The brush 80 of the wash arm 14 engages the front of the vehicle in its at rest position and moves to the right of FIG. 6 across the front of the vehicle, down the side of the vehicle, across the back of the vehicle and up the left hand side of the vehicle and across the front of the vehicle to its at rest position.

Referring to FIGS. 3 and 4, the specific action of the brush arms and brushes 80 throughout the wash cycle described with respect to both FIGS. 1 and 5 and FIGS. 6, 7 and 8 will now be described. As above described, the brushes move as suggested by arrow 110 between positions 96 and 98 by pivoting about pivot 58. By adjusting pivot 58 in the holes 68, the brush 80 can be adjusted to the vehicle to be washed and the appropriate force moments about pins 54 and 58 can be adjusted. In specific embodiments this is usually done upon installation and need not be done for each vehicle. The brush 80 by positioning the pivot 58 in the appropriate hole 68 is not only positioned correctly with regard to the width of the vehicle and the distance from axis and center line 104, but also the height of the brush with regard to the vehicle such that the brush 80 will traverse the entire vehicle side from top to the bottom of the vehicle. Properly positioned, the brush 80 will be biased into position 98 against the vehicle by gravity and gyroscopic progression as it rotates as suggested by arrows 112. Therefore there is little chance of the brush to skip over any portion of the vehicle.

In a specific embodiment in which the gravitational force moments about pin 58 are insufficient, brush 80 is biased into position 98 by means of the shock absorber/spring combination 105. The shock absorber/spring combination 105 also dampens the movement of the brush 80 when a portion of the vehicle engages the brush and moves it outwardly of the vehicle side and towards position 96 such that the movement is in response to the unevenness of the vehicle side and is not over-exaggerated by the momentum of the movement or other associated factors. Both the weight of the arm 14 and the shock absorber/biasing device 105 cause the brush to remain in engagement with the vehicle side throughout its travel across the front, down the side and across the back of the vehicle. The lubrication pads 99 facilitate the movement of the brush as above described and decrease the frictional forces between the yoke 66 and the arm 48.

As above disclosed, a new and improved vehicle wash apparatus is provided. One or a pair of brushes wash the entire vehicle, front, opposite sides and rear. All of the conventional attachments can be combined to the vehicle wash apparatus of the invention, a new vehicle wash arm is provided which is moveable as the brush of the wash arms traverses the front, side and rear of the vehicle to accommodate protrusions and indentations of the vehicle. The movement is dampened so as not to exaggerate the movement and skip portions of the vehicle and the brush is always biased against the vehicle. The improved vehicle wash apparatus of the invention provides this unique wash arm in pairs. Either a single pair as disclosed or multiple pairs can be provided to wash even the vehicles which are the most difficult to wash. The new and improved vehicle wash apparatus of the invention when compared to conventional wash apparatus has a minimum of parts, a minimum of pivot joints and a minimum of small motors, pumps and the like. It is simple in construction and requires a minimum of maintenance and upkeep to maintain the apparatus in operational condition. For all of these reasons the improved vehicle wash apparatus is relatively inexpensive to manufacture and maintain.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A vehicle washing machine comprising a frame having opposite ends and opposite sides, an endless track secured to said frame between said opposite ends and opposite sides, an arm mount within said track, said arm mount being moveable within said track, a motor operatively connected to said arm mount for moving said arm mount within said track, a wash arm having opposite ends, said wash arm being pivotally connected to said arm mount at one of said ends by a generally vertical pivot pin, said wash arm being moveable through a first arc about said generally vertical pivot pin, said frame defining vehicle wash locations between said opposite ends and sides of said frame, said track being within the periphery of a vehicle positioned in said vehicle wash locations, said wash arm having an extension, said arm extension being pivotally connected to the other of said ends of said wash arm by a generally horizontal pivot pin, said arm extension being moveable through a second arc about said horizontal pivot pin, said arm extension having a distal end, a rotating brush mounted on a shaft journaled in said distal end of said arm extension and rotatable about an axis generally perpendicular to said horizontal pivot pin, whereby said rotating brush may move through said first arc to engage the ends and sides of said vehicle and move through said second arc to accommodate irregularities from the generally vertical planar surfaces of said vehicle ends and sides as said arm mount is moved within said track.

2. The arm of claim 1 wherein said first arc is less than 180°.

3. The arm of claim 1 wherein said second arc is less than 45° from the vertical.

4. The arm of claim 1 wherein said brush rotates about said shaft toward said vehicle.

5. The arm of claim 1 wherein said brush has a generally vertical dimension of approximately the height of said vehicle.

6. The arm of claim 1 further comprising a motor on said arm extension operatively-connected to said shaft for driving said brush.

7. The arm of claim 1 further comprising a spring extending between said wash arm and said arm extension biasing said brush inwardly of said vehicle.

8. The arm of claim 1 wherein said wash arm has an at rest position and the weight of said wash arm biases said wash arm to its at rest position, and movement from said at rest position is against the weight of said wash arm.

9. The arm of claim 1 wherein said wash arm has an at rest position and the weight of said wash arm extension biases said wash arm extension into its at rest position, and movement from said at rest position is against the weight of said wash arm extension.

10. The arm of claim 1 wherein said arm extension is adjustable with respect to said wash arm so as to vary the moment arm about an axis generally perpendicular to the axis of said wash arm and to vary the force moments about said vertical pivot pin.

11. The arm of claim 1 wherein said arm extension is adjustable with respect to said wash arm both generally horizontally in overall length of said wash arm and arm extension and generally vertically in the height of said arm extension.

12. The arm of claim 1 wherein said arm extension opposite said distal end has a yoke, said wash arm being positioned within said yoke, said yoke having a plurality of holes therein by which the relative position of said wash arm and arm extension may be adjusted by moving said horizontal pivot pin from hole to hole.

13. The arm of claim 1 further comprising a shock absorber, said shock absorber dampening the movement between said arm extension and said wash arm.

14. The vehicle washing machine of claim 1 further comprising prewash apparatus, said prewash apparatus being within said frame prior to said wash arm.

15. The vehicle washing machine of claim 14 wherein said prewash apparatus is chosen from the group consisting of soaping devices, cloth drapes or curtains, tire and wheel cover cleaners, underbody wash devices, application of prewash solutions, and combinations thereof.

16. The vehicle washing machine of claim 1 further comprising postwash apparatus, said postwash apparatus being within said frame following said wash arm.

17. The vehicle washing machine of claim 16 wherein said postwash apparatus is chosen from the group consisting of dryers, drying agent sprays, waxers, polishers, corrosion protection sprays, spot free sprays and combinations thereof.

* * * * *